United States Patent
Byford

(10) Patent No.: US 11,834,951 B1
(45) Date of Patent: Dec. 5, 2023

(54) HAZARDOUS WASTE DISPOSAL USING DIRECTIONAL ANGLED DRILLING

(71) Applicant: Leo Byford, Tulsa, OK (US)

(72) Inventor: Leo Byford, Tulsa, OK (US)

(*) Notice: Subject to any disclaimer, the term of this patent is extended or adjusted under 35 U.S.C. 154(b) by 17 days.

(21) Appl. No.: 18/074,257

(22) Filed: Dec. 2, 2022

(51) Int. Cl.
| | |
|---|---|
| *E21F 15/08* | (2006.01) |
| *B09B 1/00* | (2006.01) |
| *E21B 41/00* | (2006.01) |
| *E21F 15/00* | (2006.01) |
| *B09B 101/45* | (2022.01) |
| *B09B 101/55* | (2022.01) |

(52) U.S. Cl.
CPC .............. *E21F 15/08* (2013.01); *B09B 1/008* (2013.01); *E21B 41/005* (2013.01); *E21F 15/005* (2013.01); *B09B 2101/45* (2022.01); *B09B 2101/55* (2022.01)

(58) Field of Classification Search
CPC ........ E21F 15/08; E21F 15/005; B09B 1/008; E21B 41/005
See application file for complete search history.

(56) References Cited

U.S. PATENT DOCUMENTS

| | | | |
|---|---|---|---|
| 1,404,112 A * | 1/1922 | Goebl ..................... | E21F 15/08 299/17 |
| 4,058,405 A | 11/1977 | Snyder et al. | |
| 4,257,814 A | 3/1981 | Kellet et al. | |
| 4,419,135 A | 12/1983 | Hoge | |
| 4,536,035 A * | 8/1985 | Huffman ................. | E21C 41/18 299/17 |
| 4,746,249 A | 5/1988 | Haigh et al. | |
| 4,773,488 A * | 9/1988 | Bell ........................ | E21B 7/04 175/61 |
| 5,224,595 A | 7/1993 | Sugimoto et al. | |
| 5,433,553 A * | 7/1995 | Pearson .................. | B09B 1/00 405/59 |
| 2006/0144298 A1 * | 7/2006 | Byford .................... | C04B 28/12 106/638 |

* cited by examiner

*Primary Examiner* — Janine M Kreck
(74) *Attorney, Agent, or Firm* — GableGotwals

(57) ABSTRACT

A method of this disclosure directionally drills at least one well extending from ground surface to an interior of an underground mine located below ground, the well being at an oblique angle relative to vertical; blends or mixes together a hazardous material, like lead, zinc, arsenic, and cadmium with cement including a plasticizer; pumps or flows the mixture into the well, wherein the mixture flows toward a lower end of the mine and hardens in place. The method allows for the permanent placement of contaminated mixtures like chat into mines or shafts or depositories, as defined by the United States Environmental Protection Agency, CERCLA and Superfund laws and complies with rules for the permanent closing of these structures with contaminated material and contaminated substances.

14 Claims, 1 Drawing Sheet

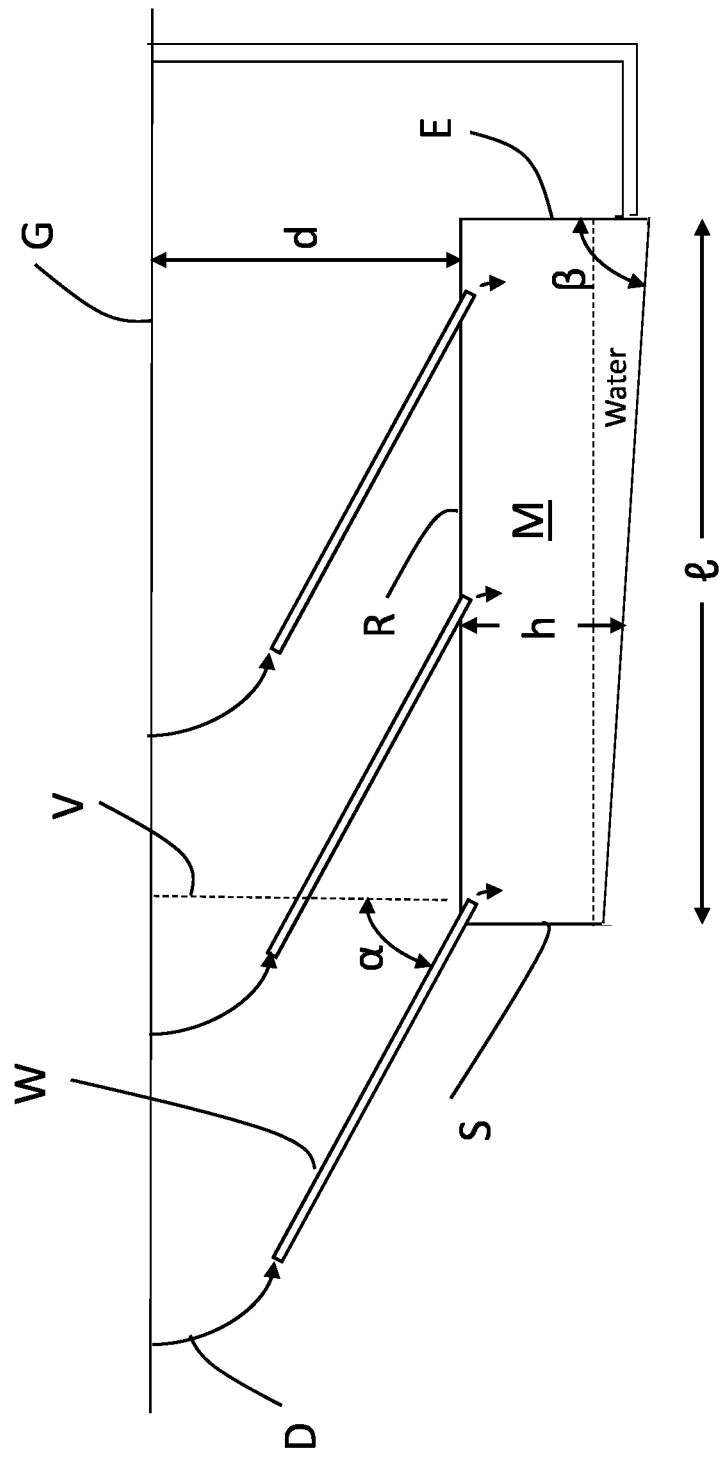

HAZARDOUS WASTE DISPOSAL USING DIRECTIONAL ANGLED DRILLING

BACKGROUND

This disclosure is in the field of hazardous waste disposal and, in particular, chat. For purposes of this disclosure, chat" means gravel-like mine or mill tailings (greater than ¼ inch diameter) plus sands #20-65 mesh size or 0.033-0.008 inches in diameter and fine tailings less than 0.008 inches in diameter that come from waste rock or ores as material produced from mining.

There is about 30 million tons of chat at the Tar Creek Superfund site. The Oklahoma Department of Environmental Quality describes the Tar Creek Superfund Site as
part of the Tri-State Mining District, which includes northeastern Oklahoma, southeastern Kansas, and southwestern Missouri, The site originally produced lead and zinc to make bullets during both World Wars. Mining waste, known locally as "chat", was left on the surface of the site when mining operations ceased in the 1970s. Chat contains lead, zinc, and cadmium. People should avoid contact with chat. Cleanup of the over 30 million tons of chat is continuing at the Tar Creek Superfund Site.

Tar Creek was added to the National Priorities (Superfund) list in 1983. Various attempts to deal with the surface water contamination were made in the 80s and 90s. In 2000, Governor Frank Keating commissioned a study to develop a comprehensive remediation plan for the area. In 2002, DEQ studied metals concentrations in fish from waters impacted by the Tri-State Mining District, including Tar Creek. Fish consumption advisories were issued as a result.

In 2005, the State of Oklahoma, under the Oklahoma Plan, began cleaning up some contaminated areas and restored 329 acres of land to beneficial use. In 2006, the State of Oklahoma passed legislation that allowed for the voluntary buyout of citizens with children in the area. In 2010, EPA began the implementation of the Operable Unit 4 Record of Decision work that involves remediating properties to allow for beneficial reuse and voluntary buyout of citizens of the Relocation Assistance Zone.

Chat has been sold for road building material and other uses but 30 million tons of chat remain in the Tar Creek area. The University of Oklahoma's department of Civil Engineering and Environmental Science has undertaken a project to bioremediate ground water from abandoned mines. This treatment process uses a series of ponds to naturally remove lead, zinc, cadmium, and iron from the water, and then discharges it into a tributary of Tar Creek. DEQ, EPA, and the Quapaw Tribe continuously work with local communities, public, and private organizations within the Tri-State area, to monitor the effects of remaining mine wastes and implement projects that promote better land, water, and air quality.

To date, the United States Environmental Protection Agency (EPA) and other government agencies, mining companies, and private waste disposal and engineering companies have made numerous attempts to place the chat into mines and shafts and depositories by means of several different processes and all of those processes. The attempts have failed, due to the complexity of the structures and the mix of contaminated materials would cone or not be able to flow in the structures. Additionally, the processes attempted did not allow for the displacement of water in the mines or shafts or have the ability to use pressure material pumps to place these contaminated materials into the mines or shafts or depositories.

Prior art patents directed to mine closure, such as U.S. Pat. No. 4,419,135 Hoge, U.S. Pat. No. 4,746,249 Haigh, U.S. Pat. No. 5,224,595 Sugimoto, U.S. Pat. No. 4,058,405 Snyder, and U.S. Pat. No. 4,257,814 Kellet, do not use contaminated material in their slurries or mixes, nor do they allow for the introduction of other fillers or compounds to be added.

SUMMARY

A method of this disclosure includes directionally drilling at least one well extending from ground surface to an interior of an underground mine, a lowermost end of the well penetrating a roof of the mine and extending into the mine shaft no more than 25% of the height of the mine, the well being at an oblique angle relative to vertical and in a direction toward an end of the mine, the angle being in a range of 15° to 60°; blending or mixing together a hazardous material, like lead, zinc, arsenic, and cadmium produced from the underground mine, with cement or lime including a plasticizer; pumping the mixture into the well where the mixture then exits a bottom end of the well into the underground mine, the mixture not coning but rather flowing along an incline of the mine toward a lower end of the mine, the mixture displacing water in the underground mine and then hardening in place. In embodiments, the hazardous material may be chat.

DRAWING

The drawing is schematic of an underground mine into which a plurality of wells have been directionally drilled through a roof of the mine shaft. A mixture of hazardous material and a cement or lime including a plasticizer exits each well, the mixture dropping down out of the well and flowing along an incline of the mine toward a lower end of the mine.

DETAILED DESCRIPTION

This disclosure incorporates by reference herein the subject matter of US 2006/0144298 A1.

Embodiments of this disclosure blend a hazardous material like lead, zinc, arsenic, and cadmium produced from the underground mine with cement or lime including a plasticizer. In some embodiments, the hazardous material may be chat. Water may be added as needed. The plasticizer allows the mixture to flow for a longer period of time than it would otherwise, delays the start of curing, and enables the mixture to be self leveling. Once the mixture cures, the chat remains in place.

Referring to the drawing, in embodiments of a method of this disclosure, a plurality of wells (W) are directionally drilled (D) and oriented at an oblique angle (a) relative to vertical (V) and in a direction toward the end (E) of the mine so that a lowermost end of each well penetrates a roof (R) of the mine, the roof being located at a depth (d) below ground level (G). The angle of each well may be as little as 15° or as much as 60°, there being subranges within this broader range as well as discrete values. The wells may be at the same angle as one another or be at different angles.

At each location where a well penetrates the roof, the mine has a height (h), with the lowermost end of the well not extending beyond 25% of the height of mine at that location, there being extensions into the mine less than 25% (provided the well still penetrates the roof). The mine may have an incline (β) relative to horizontal, and this incline may be constant or vary along the entire length (l) of the shaft. The shaft may be dry or contain water. The end of the mine shaft may be a water hole end and include a well arranged to pump water from the mine.

In embodiments, each well may be cased with PVC pipe and may be 4" to 8" inches in diameter. Two or more wells may be drilled per underground mine, one well being drilled toward a start (S) of the mine, and another being drilled at a halfway point along the entire length of the mine, each well being oriented toward the water hole end of the mine.

Embodiments of this disclosure allow for the disposal of chat by means of pumping or gravity flow into mines or shafts or depositories that are either wet or dry. In some embodiments, the method makes use of the contaminated water that has been allowed to stay in the mines or shafts or depositories for decades. The contaminated water is pumped to surface where it mixes with the chat and cement for reintroduction into the mine.

The method allows for the permanent placement of the contaminated mix into mines or shafts or depositories, as defined by the United States Environmental Protection Agency, and complies with Superfund laws and rules for the permanent closing of these structures. The introduction of these contaminated materials into the mines or shafts or depositories will allow for the structures to be returned to a condition of soundness, stop the discharge of contaminated water and contaminated materials to the environment, stop fine tailings being discharged into the air from chat piles, and allow for the return of the land to a usable condition.

What is claimed:

1. A method for permanent disposal of chat containing at least one hazardous material selected from the group consisting of lead, zinc, arsenic, and cadmium, the method comprising:
   providing at least one disposal well extending from a ground surface to an interior of an abandoned underground mine cavity having a negative slope along its length, a lowermost end of the well spaced a horizontal distance from a distal end of the abandoned underground mine cavity and penetrating a roof of the abandoned underground mine cavity and extending into the abandoned underground mine cavity no more than 25% of a vertical height of the abandoned underground mine cavity, a remaining portion of the vertical height residing below a bottom end of the disposal well, the disposal well having a negative slope, being oriented at an angle relative to vertical and inclined in a direction toward the distal end of the abandoned underground mine cavity, the angle of the disposal well being in a range of 15° to 60°;
   mixing together the chat with a plasticizer and at least one of cement and lime, the plasticizer being added in an amount effective for allowing the mixture to travel to the distal end of the abandoned mine cavity before the mixture cures;
   flowing the mixture into an uppermost end of the disposal well and allowing the mixture to exit a bottom end of the disposal well and downwardly into the abandoned underground mine cavity;
   wherein, the mixture after exiting the disposal well flows along an incline of the abandoned underground mine cavity toward the distal end of the abandoned underground mine cavity and displaces water at the distal end of the abandoned underground mine cavity;
   removing the displaced water from the abandoned underground mine cavity; and
   allowing the mixture to cure within the abandoned underground mine cavity after displacing the water.

2. The method of claim 1, wherein, the mixing further includes sand.

3. The method of claim 1, wherein, the mixing further includes water.

4. The method of claim 3, wherein, the water includes the displaced water removed from the abandoned underground mine cavity.

5. The method of claim 1, wherein, the flowing includes pumping the mixture.

6. The method of claim 1, wherein, the flowing is a gravity flow.

7. A method for permanent disposal of chat containing at least one hazardous material selected from the group consisting of lead, zinc, arsenic, and cadmium, the method comprising:
   providing at least one disposal well extending from a ground surface to an interior of an abandoned underground mine cavity having a negative slope along its length, a lowermost end of the well spaced a horizontal distance from a distal end of the abandoned underground mine cavity and penetrating a roof of the abandoned underground mine cavity and extending into the abandoned underground mine cavity no more than 25% of a vertical height of the abandoned underground mine cavity, a remaining portion of the vertical height residing below a bottom end of the disposal well, the disposal well having a negative slope, being oriented at an angle relative to vertical and inclined in a direction toward the distal end of the abandoned underground mine cavity, the angle of the disposal well being in a range of 15° to 60°;
   mixing together the chat with a plasticizer and at least one of cement and lime, the plasticizer being added in an amount effective for allowing the mixture to travel to the distal end of the abandoned mine cavity before the mixture cures;
   flowing the mixture into an uppermost end of the disposal well and allowing the mixture to exit a bottom end of the disposal well and downwardly into the abandoned underground mine cavity;
   wherein, the mixture after exiting the disposal well flows along an incline of the abandoned underground mine cavity toward the distal end of the abandoned underground mine cavity; and
   allowing the mixture to cure within the abandoned underground mine cavity at the distal end.

8. The method of claim 7, wherein, the mixture displaces water at the distal end of the abandoned underground mine cavity.

9. The method of claim 8, wherein, after displacing the water, removing the displaced water from the abandoned underground mine cavity.

10. The method of claim 9, wherein, the allowing the mixture to cure within the abandoned underground mine cavity occurs after the displacing the water.

11. The method of claim 9, wherein, the mixing further includes the displaced water removed from the abandoned underground mine cavity.

12. The method of claim 7, wherein, the mixing further includes sand.

13. The method of claim 7, wherein, the flowing includes pumping the mixture.

14. The method of claim 7, wherein, the flowing is a gravity flow.

* * * * *